(12) United States Patent
Liu

(10) Patent No.: US 12,202,570 B2
(45) Date of Patent: Jan. 21, 2025

(54) BIKE TRAILER WITH IMPROVED TOP COVER

(71) Applicant: Cheh-Kang Liu, Taipei (TW)

(72) Inventor: Cheh-Kang Liu, Taipei (TW)

(*) Notice: Subject to any disclaimer, the term of this patent is extended or adjusted under 35 U.S.C. 154(b) by 492 days.

(21) Appl. No.: 17/828,118

(22) Filed: May 31, 2022

(65) Prior Publication Data

US 2023/0382487 A1 Nov. 30, 2023

(51) Int. Cl.
*B62K 27/16* (2006.01)
*B62K 27/00* (2006.01)

(52) U.S. Cl.
CPC ............ *B62K 27/16* (2013.01); *B62K 27/003* (2013.01)

(58) Field of Classification Search
CPC ....... B62K 27/003; B62K 27/04; B62K 27/16
USPC ........ 280/204; 296/113, 126, 133, 134, 168; 135/40, 88.1
See application file for complete search history.

(56) References Cited

U.S. PATENT DOCUMENTS

| | | | | |
|---|---|---|---|---|
| 2,884,980 A | * | 5/1959 | Miller | A45C 11/26 |
| | | | | 150/900 |
| 4,171,145 A | * | 10/1979 | Pearson, Sr. | B62J 19/00 |
| | | | | 296/136.03 |
| 5,687,980 A | * | 11/1997 | Eckroth | B62K 27/16 |
| | | | | 280/42 |

* cited by examiner

*Primary Examiner* — James A English
*Assistant Examiner* — Felicia L. Brittman-Alabi
(74) *Attorney, Agent, or Firm* — Demian K. Jackson; Jackson IPG PLLC

(57) ABSTRACT

A bike trailer with improved top cover includes a trailer frame installed with a seat, a top cover, a left panel and a right panel. One side of the top cover is fixed to one side of the trailer frame. A connecting member and a connected member are respectively provided between the other side of the top cover and the other side of the trailer frame so that the top cover can be opened when the connecting member is disengaged from the connected member. The top cover is provided with an accommodating space along the direction of opening to receiving direction, and a stretched and straightened coiled leaf spring is installed in the accommodating space and fixed on the top cover.

1 Claim, 11 Drawing Sheets

BIKE TRAILER WITH IMPROVED TOP COVER

BACKGROUND AND SUMMARY OF THE INVENTION

The present invention relates to an improvement of the top cover of a bike trailer, and relates to a related technical field in which at least one coiled leaf spring is fixed on the top cover of a bike trailer, so that the top cover can be automatically rolled up and stored.

The conventional bike trailer is used to connect to the back of the bicycle, so that the bicycle can travel on the road together with its connected bike trailer. However, it has been checked that when the top cover installed on the frame of this bike trailer is to be opened, in addition to opening the first connecting component between one end of the top cover and the frame, it is also necessary to slowly roll up the top cover manually and store it towards the other end. In other words, it is necessary to align and store slowly at any time during operation, and after rolling it to the upper end, it needs to be tied with a fixing piece to keep it at the upper end. Therefore, not only the storage operation of rolling up and aligning the top cover is very troublesome, but also it is easy to finish the storage operation and it is still not neat and time-consuming. Especially when a child or pet needs to get in and out of the bike trailer seat in a hurry, it further causes trouble and inconvenience in use.

SUMMARY OF THE INVENTION

The present invention has been accomplished under the circumstances in view. It is therefore the main object of the present invention to provide an improved top cover for a bike trailer, wherein the top cover can be automatically rolled up and stored by the elastic restoring force of the coiled leaf spring, so that children or pets can easily and quickly enter and exit the bike trailer.

It is another object of the present invention to provide an improved top cover for a bike trailer, wherein the top cover can be automatically rolled up and stored, and the operation is simple and convenient and saves time.

DETAILED DESCRIPTION OF THE INVENTION

Figure 8:
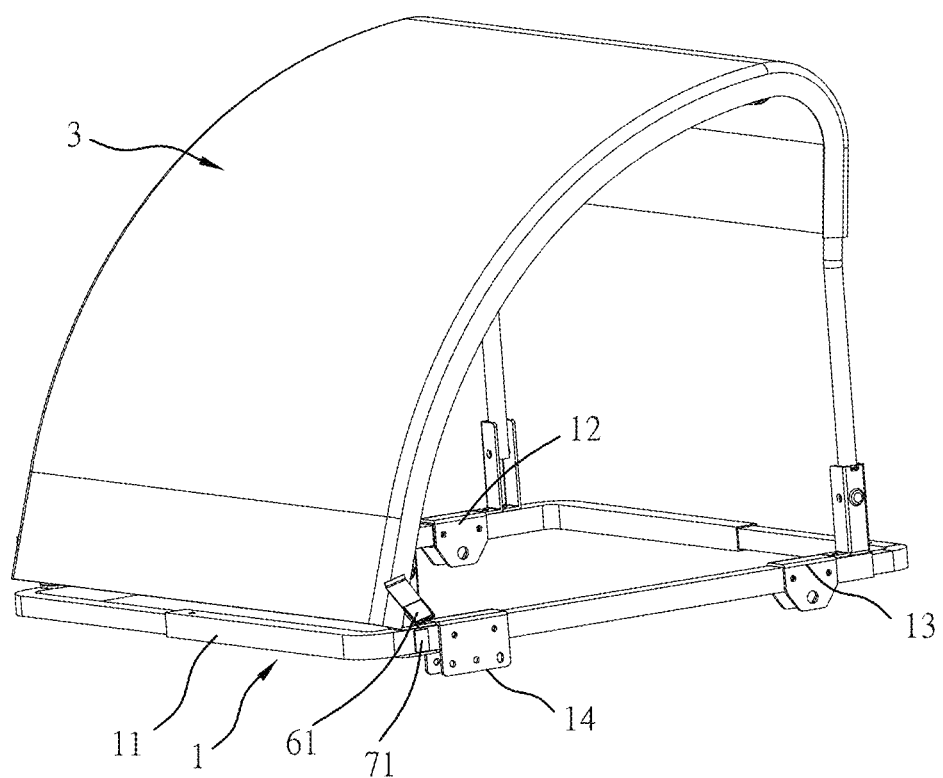
FIG. 8 is a perspective view of the connecting member in FIG. 3 being changed to a male Velcro and the connected member to a female Velcro.
Figure 9:
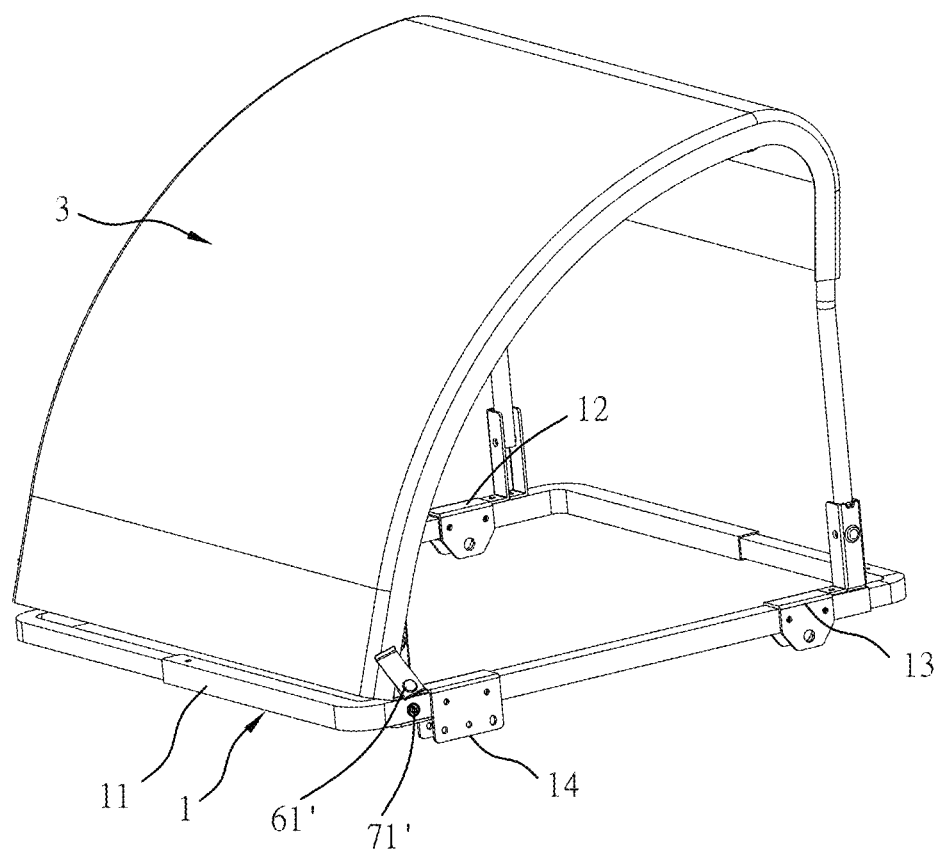
FIG. 9 is a perspective view of the connecting member in FIG. 3 being changed to a male snap button fixed on a belt body or rope body and the connected member to a female snap button fixed on a belt body or rope body.
Figure 10:
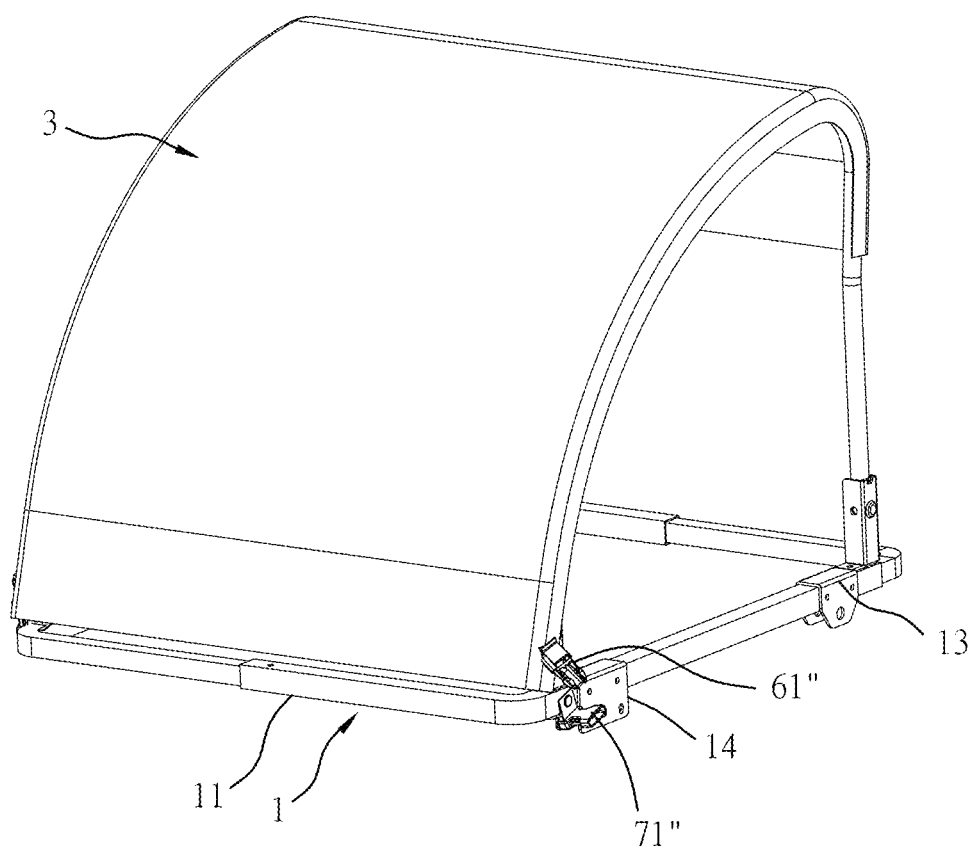
FIG. 10 is a perspective view of the connecting member in FIG. 3 being changed to a male buckle and the connected member to a female buckle.
Figure 11:
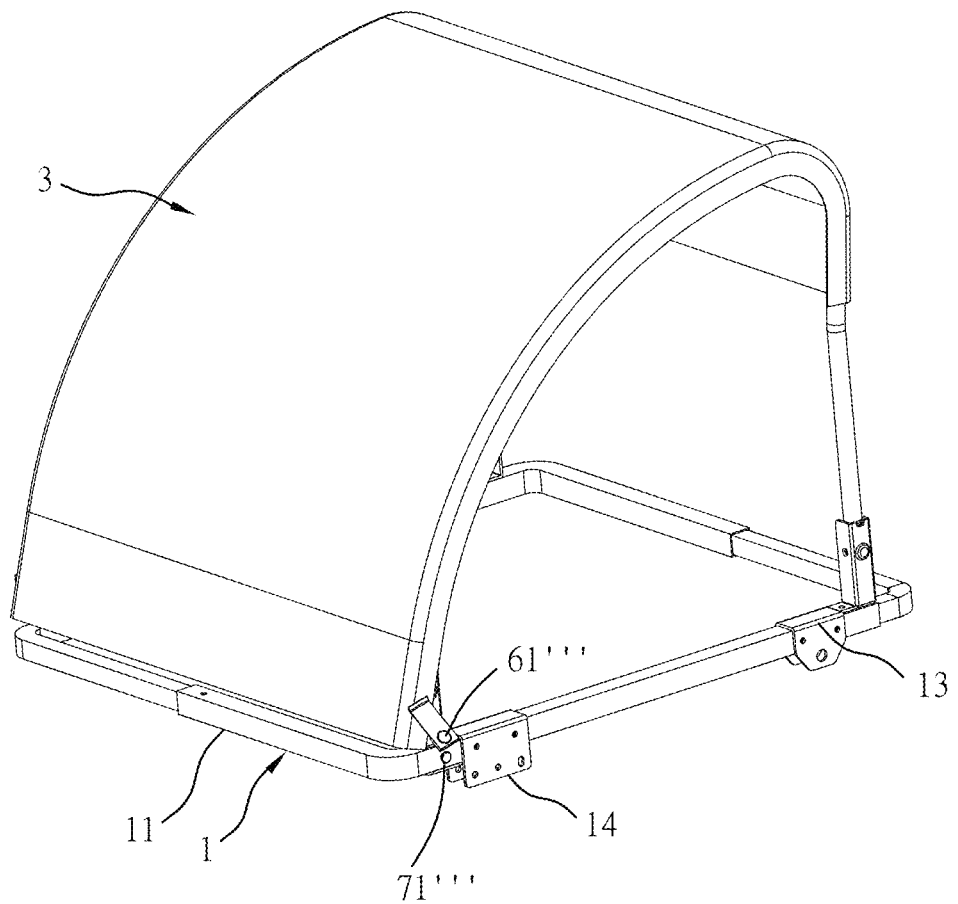
FIG. 11 is a perspective view of the connecting member in FIG. 3 being changed to a first magnet and the connected member to a second magnet.

As shown in FIG. 1 to FIG. 7, the invention is an improvement of the top cover of a bike trailer. The bike trailer 1 comprises a trailer frame 11, a left wheel frame 12 and a right wheel frame 13 respectively provided on a lower rear side of the trailer frame 11 for installing a left wheel (not shown) and a right wheel (not shown) respectively, a bicycle connecting seat 14 provided on a lower front side of the trailer frame 11 for connecting with a bicycle (not shown), a seat 2 (refer to FIG. 7) and a top cover 3 provided on the trailer frame 11, and a left side cover 4 and a right side cover 5 located on opposing left and right sides of the seat 2. The front side of the seat 2 is connected to a base 21 (refer to FIG. 7). The top cover 3 can be made of various materials such as woven cloth, plastic cloth, synthetic cloth, cloth including flexible plastic parts, etc. One side of the top cover 3 is fixed to one side of the trailer frame 11 (eg, the upper rear side). Between the other side of the top cover 3 and the other side of the trailer frame 11 (for example, the lower front side of the trailer frame), at least a connecting member 6 and a connected member 7 are respectively provided. The top cover 3 can be opened when the connecting member 6 is disengaged from the connected member 7. The connecting member 6 is a male snap button (refer to FIG. 1), a male Velcro 61 (refer to FIG. 8), a male snap button 61' fixed on a belt body or rope body (refer to FIG. 9), a male buckle 61" (refer to FIG. 10), or a first magnet 61''' (refer to FIG. 11). The connected member 7 is a female snap button (refer to FIG. 1), a female Velcro 71 (refer to FIG. 8), and a female snap button 71' fixed on a belt body or rope body (refer to FIG. 9), a female buckle 71" (refer to FIG. 10), or a second magnet 71''' (refer to FIG. 10) that can attract and connect with the first magnet (refer to FIG. 11).

Figure 1:
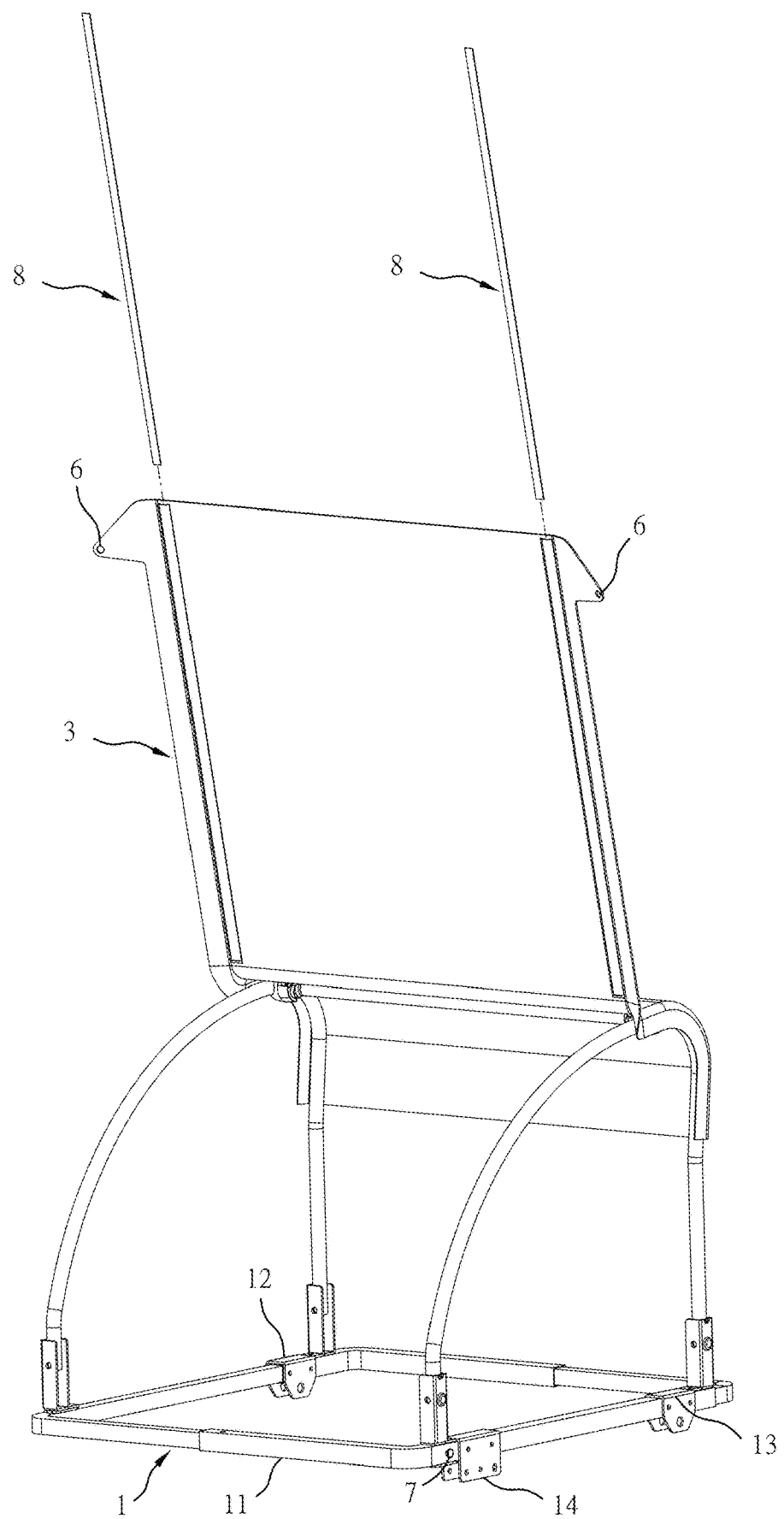
FIG. 1 is a schematic exploded perspective view showing that the coiled leaf spring and the top cover after being stretched and straightened have not been fixed.
Figure 2:
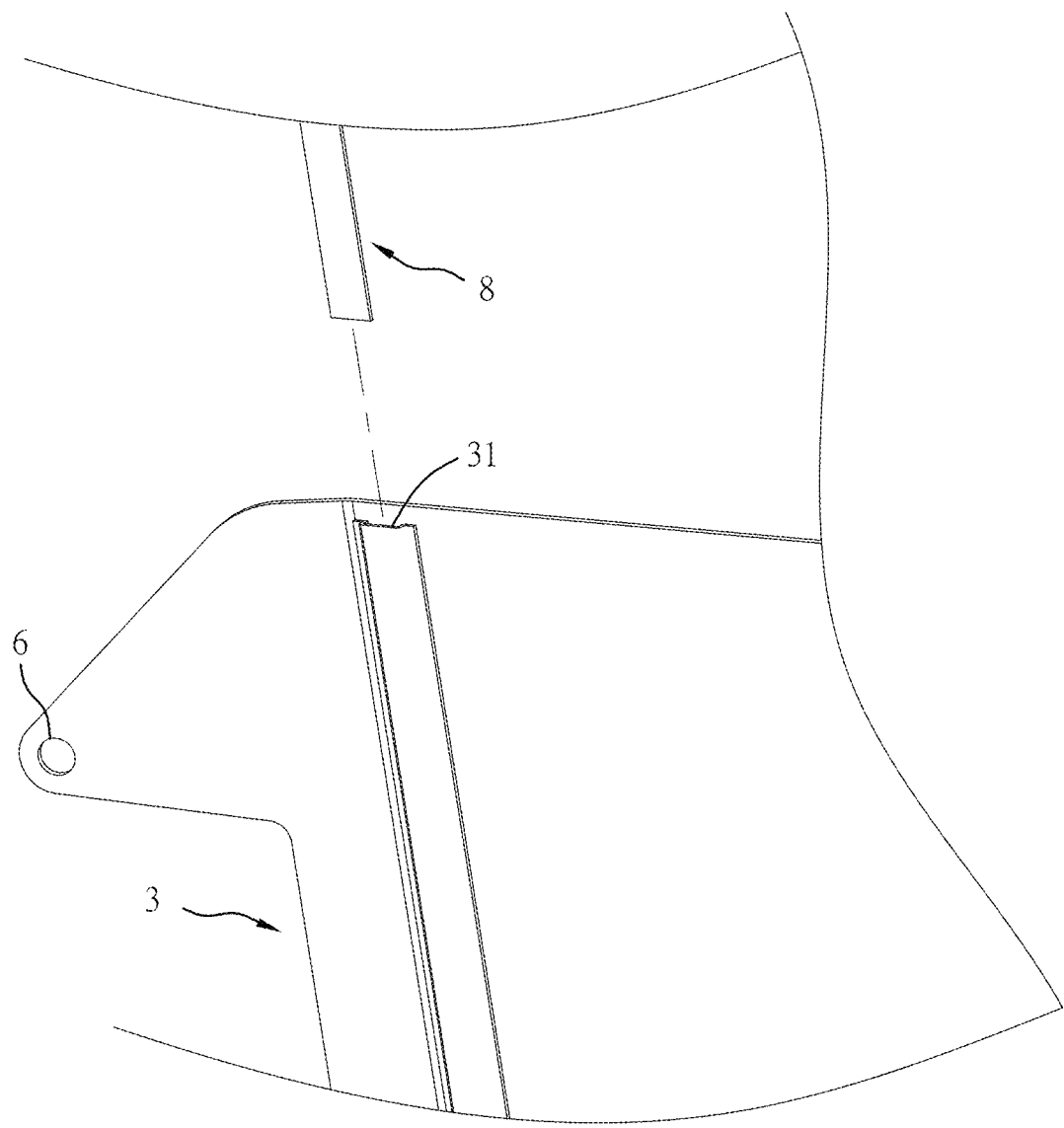
FIG. 2 is a partial perspective enlarged view of FIG. 1.
Figure 3:
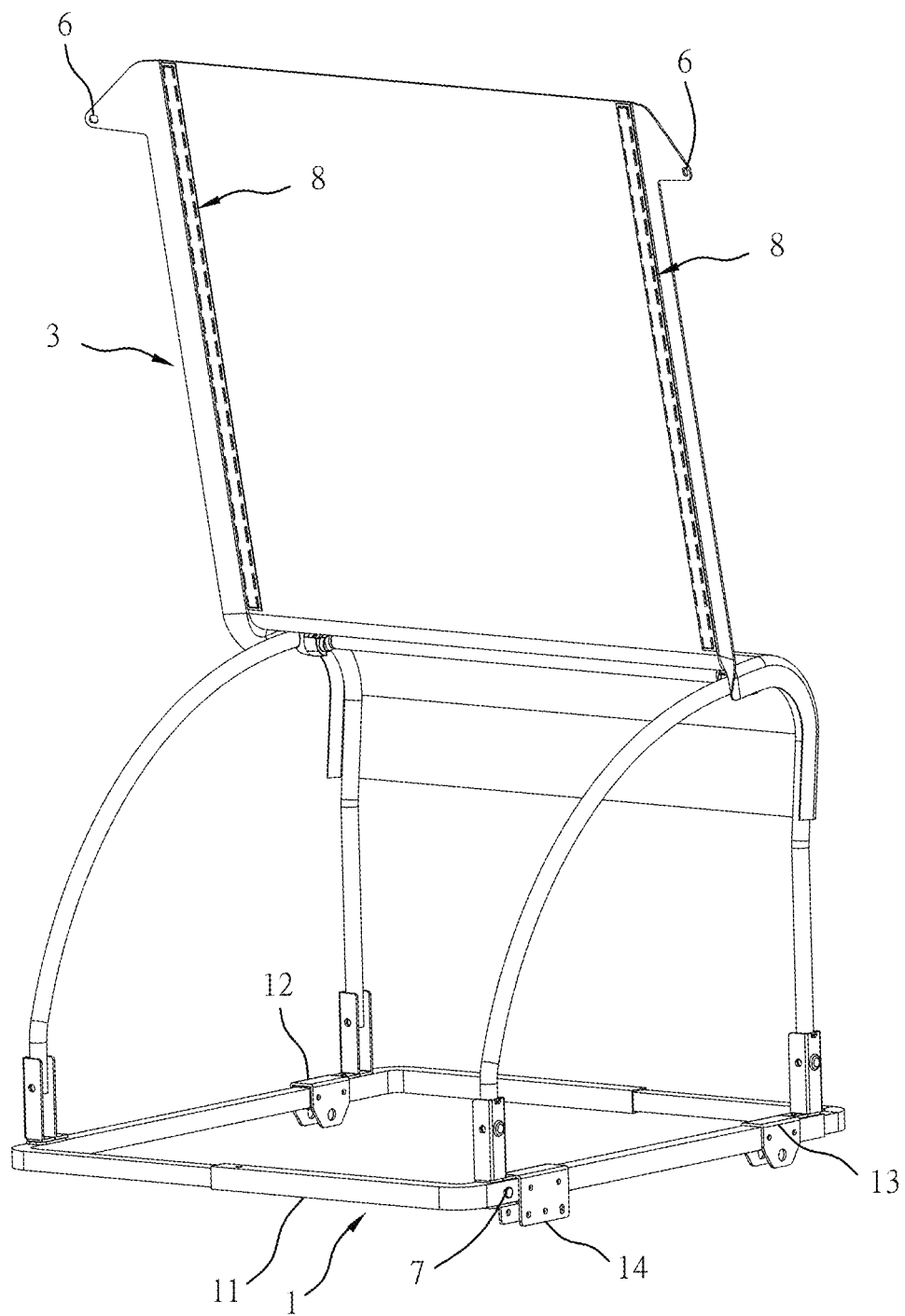
FIG. 3 is a three-dimensional schematic diagram showing that the stretched and straightened coiled leaf spring is fixed to the top cover but has not been rolled up and stored in an embodiment of the present invention.
Figure 4:
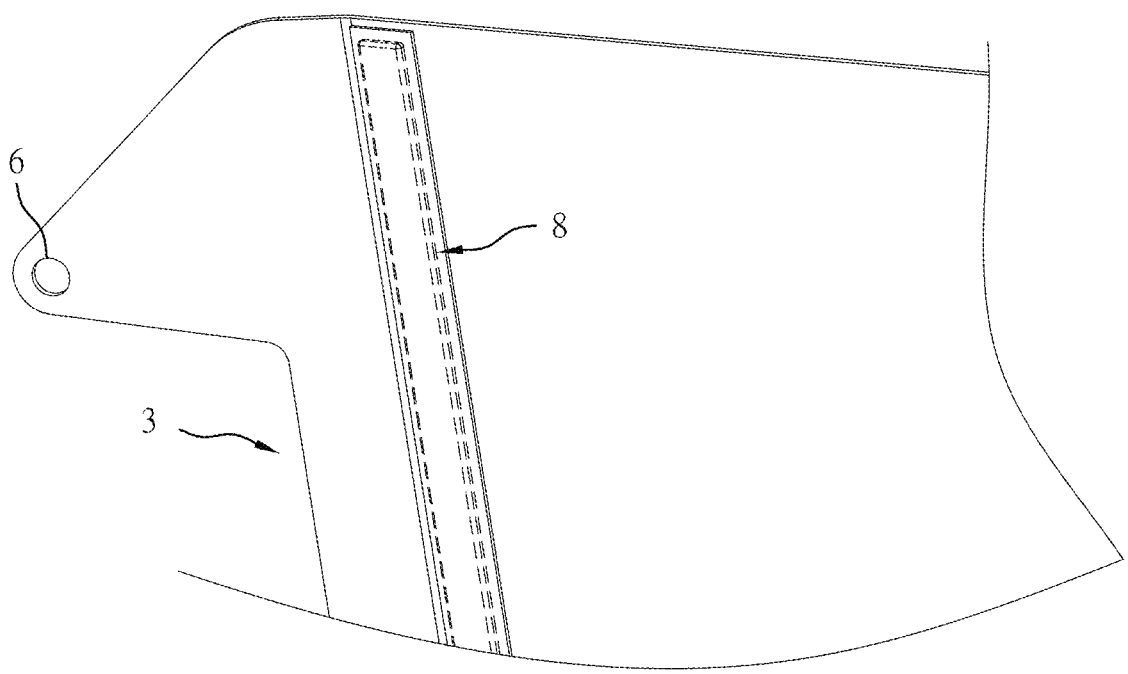
FIG. 4 is a partial perspective enlarged view of FIG. 3.
Figure 5:
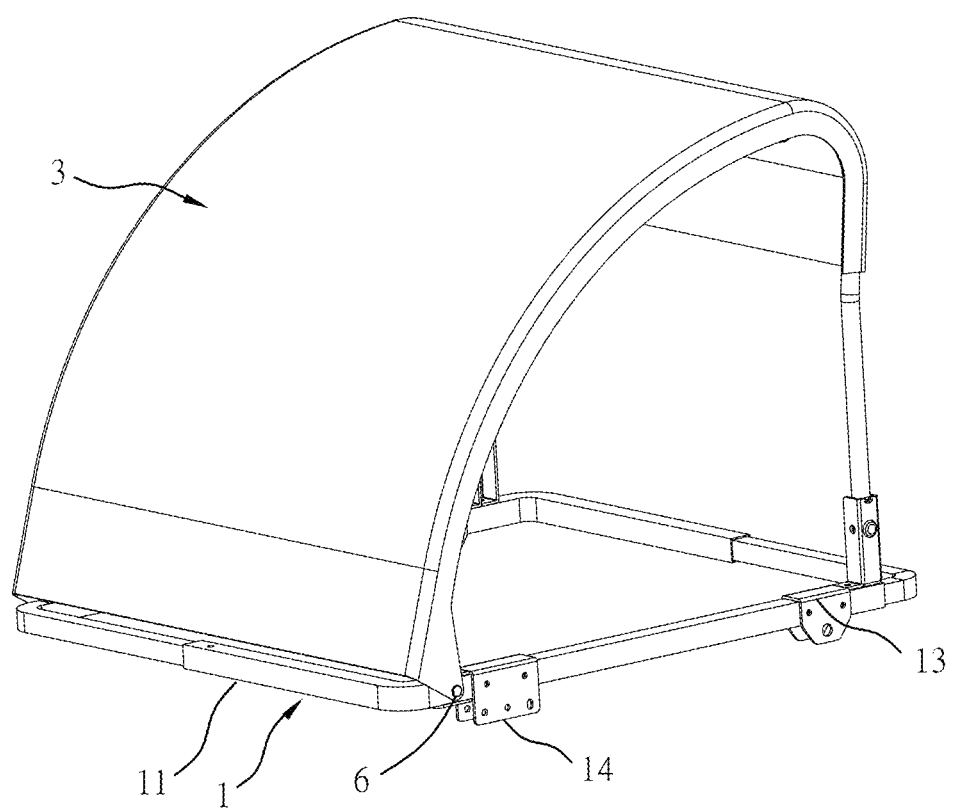
FIG. 5 is a perspective view of the embodiment of the present invention wherein the top cover is installed on the bike trailer and the top cover has not been rolled up and stored.

The invention is characterized in that:

The top cover 3 is provided with at least one accommodating space 31 (refer to FIG. 2) by sewing or other means along the direction of opening to receiving direction, so as to install at least one stretched and straightened coiled leaf spring 8 (refer to FIGS. 1 to 4), and fix the coiled leaf spring 8 on the top cover 3 by sewing or other means (refer to FIGS. 3 to 5).

Figure 6:
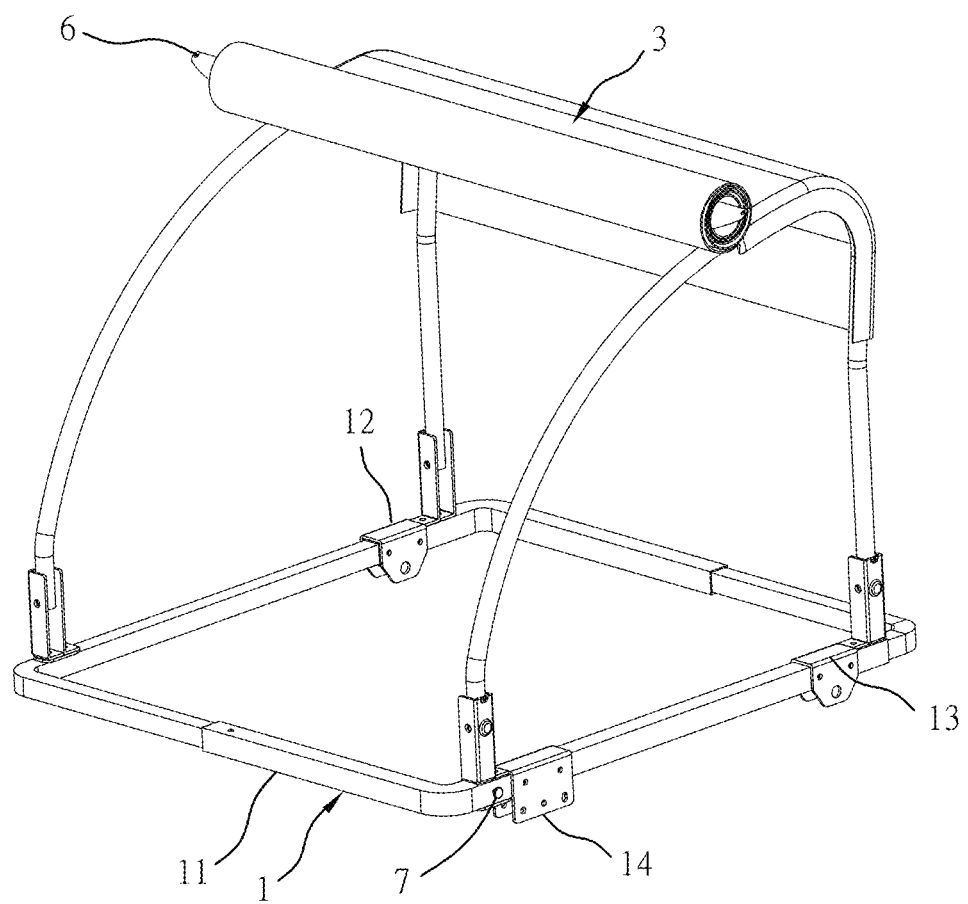
FIG. 6 is a perspective view of the embodiment of the present invention where the top cover is installed on the bike trailer and the top cover has been rolled up and stored.
Figure 7:
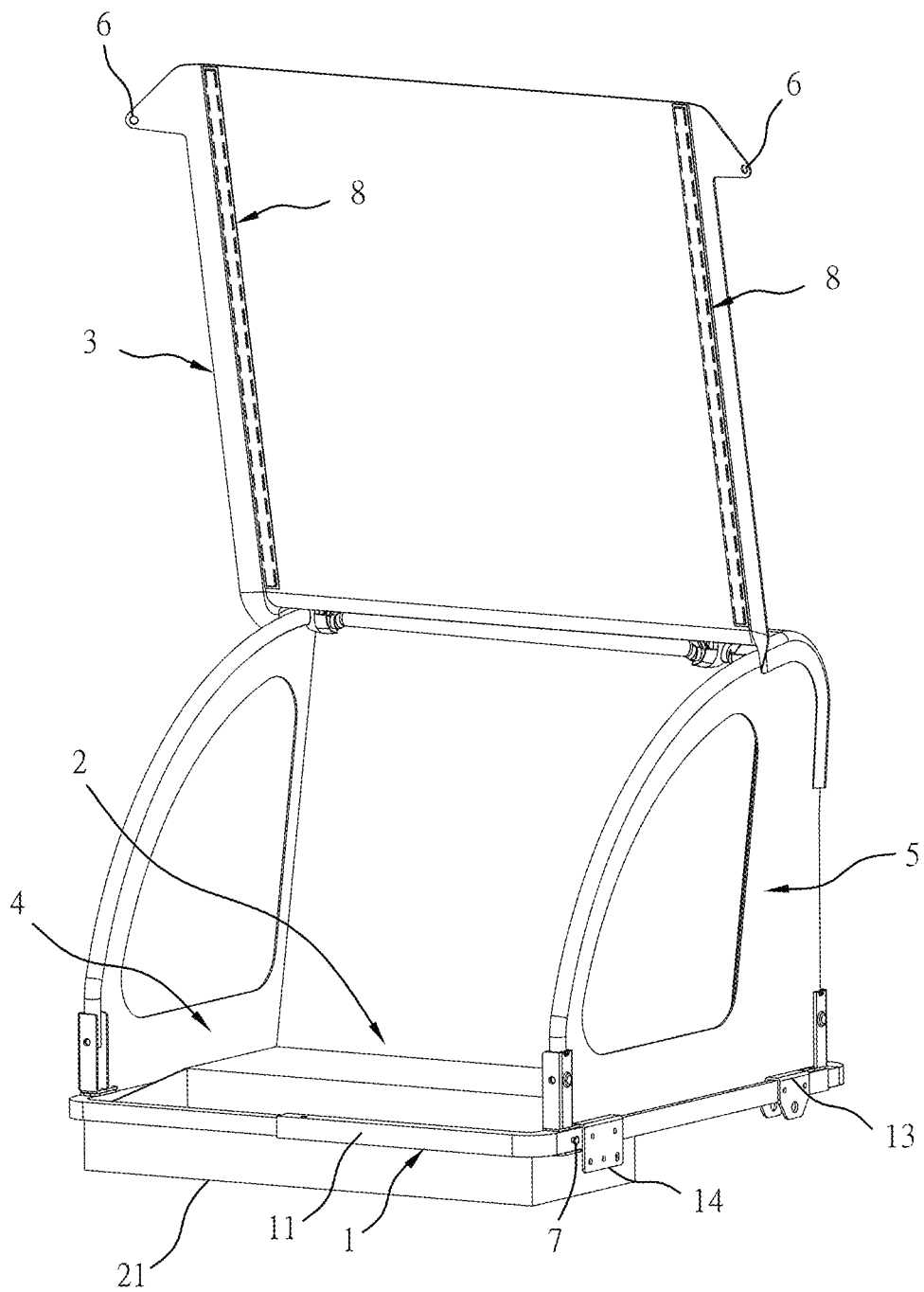
FIG. 7 is a perspective view showing the additional installation of the seat, base, left panel and right panel of FIG. 3.

Thereby, when the connecting member 6 is separated from the connected member 7, the top cover 3 can be automatically rolled up by the elastic restoring force of the coiled leaf spring 8 and stored on one side of the trailer frame 11 of the bike trailer 1 (for example, rear top side of the trailer frame 11, refer to FIG. 6), to quickly and conveniently allow children or pets to enter and exit the seat 2 of the bike trailer 1, and relatively achieve the purpose of automatic winding and storage operation is simple and convenient and saves time to quickly and conveniently allow children or pets to enter and exit the seat 2 of the bike trailer 1, and relatively achieve the purpose of automatic winding and storage operation, which is simple and convenient and saves time. When you want to close the top cover 3, you only need to stretch the stored top cover 3 in reverse, and connect the connecting member 6 to the connected member 7 (refer to FIG. 5), and the operation is also very convenient.

In summary, the invention of the present invention can be summarized as having the following enhancement effects:

1. The top cover 3 can be automatically rolled up and stored by the elastic restoring force of the coiled leaf spring 8, so that children or pets can easily and quickly enter and exit the seat 2 of the bike trailer 1.

2. The top cover 3 can be automatically retracted and stored, which is simple and convenient to operate and saves time.

What is claimed is:

1. A bike trailer with an improved top cover, comprising a trailer frame, a left wheel frame and a right wheel frame respectively provided on a lower rear side of said trailer frame for installing a left wheel and a right wheel respectively, a bicycle connecting seat provided on a lower front side of said trailer frame for connecting with a bicycle, a seat and a top cover provided on said trailer frame and a left side cover and a right side cover located on opposing left and right sides of said seat, said seat having a front side thereof connected with a base, said top cover being made of cloth, said top cover having one side thereof fixed to one side of said trailer frame, at least a connecting member and a connected member being respectively provided between an opposite side of said top cover and an opposite side of said trailer frame so that said top cover is openable when said connecting member is disengaged from said connected member, said connecting member being selectively a male snap button, a male Velcro, a male snap button fixed on a belt body or rope body, a male buckle or a first magnet, said connected member being selectively a female snap button, a female Velcro, a female snap button fixed on a belt body or rope body, a female buckle or a second magnet attractable and connectable with said first magnet wherein:

said top cover is provided with at least one accommodating space along the direction of opening to receiving direction, and a stretched and straightened coiled leaf spring is installed in each said accommodating space and fixed on said top cover by sewing, so that the top cover is automatically rolled up by the elastic restoring force of said coiled leaf spring and stored on the opposite side of said trailer frame of said bike trailer.

\* \* \* \* \*